3,660,496
PREPARATION OF SULFIDES AND SULFOXIDES
Louis Schmerling, Riverside, Ill., assignor to Universal Oil Products Company, Des Plaines, Ill.
No Drawing. Filed Oct. 16, 1969, Ser. No. 867,086
Int. Cl. C07c *149/16, 147/14*
U.S. Cl. 260—607 A                                11 Claims

ABSTRACT OF THE DISCLOSURE

Organic sulfur-containing compounds and particularly organic sulfoxides or sulfides are prepared by condensing thionyl chloride with an olefinic hydrocarbon in the presence of a free radical generating catalyst to prepare organic sulfoxides or sulfides depending upon the temperature which is utilized during the reaction.

---

This invention relates to a process for preparing organic sulfur-containing compounds and particularly, to a process for preparing organic sulfoxides or organic sulfides. More specifically, the invention is concerned with a process for condensing thionyl chloride with a unsaturated organic compound in the presence of certain catalytic compositions of matter to prepare the desired product.

The products which are obtained when utilizing the novel process of the present invention, said products comprising organic sulfoxides or organic sulfides, will find a wide variety of uses in the chemical field. For example, the organic sulfoxides comprising bifunctional compounds may be utilized as intermediates in the preparation of plastics. Yet another use of the products of the process of this invention, namely, the sulfides which also contain a chlorine substituent is as vesicants, a specific example of this being bis(2-chloroethyl)sulfide which is also known as "mustard gas." This latter compound is well known to possess relatively powerful vesicant properties.

It is therefore an object of this invention to provide a process for preparing organic sulfur-containing compounds by utilizing certain catalytic compositions of matter.

Another object of this invention is to provide a process for preparing either organic sulfoxides or organic sulfides by utilizing certain catalytic compositions of matter and effecting the reaction at certain temperatures, said temperature being dependent upon whether a sulfoxide or sulfide is the desired product.

In one aspect an embodiment of this invention resides in a process for the preparation of an organic sulfoxide or sulfide compound which comprises condensing thionyl chloride with an olefinic hydrocarbon in the presence of a free radical generating compound at a temperature at least as high as the decomposition temperature of said compound, and recovering the resultant organic sulfoxide or sulfide compound.

A specific embodiment of this invention resides in the process of the preparation of an organic sulfoxide which comprises condensing thionyl chloride with ethylene in the presence of benzoyl peroxide at a temperature in the range of from about 80° to about 90° C., and recovering the resultant bis(2-chloroethyl)sulfoxide.

Other objects and embodiments will be found in the following further detailed description of the present invention.

As hereinbefore set forth the present invention is concerned with the process for producing an organic sulfur-containing compound and particularly, an organic sulfoxide or organic sulfide. The reaction is effected by condensing thionyl chloride with an olefinic hydrocarbon in the presence of a free radical generating catalyst. Examples of olefinic hydrocarbons which may be condensed with the thionyl chloride preferably comprise 1-alkenes containing from 2 up to about 20 carbon atoms. Specific examples of these 1-alkenes include ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-octadecene, 1-hexadecene, 1-heptadecene, 1-nonadecene, 1-eicosene, the various isomers of these compounds including both straight chain and branch chain forms thereof. It is also contemplated within the scope of this invention that the analogs of the 1 - alkenes such as cyclopentene, cyclohexene, styrene, allylbenzene, crotonylbenzene, etc. may also be utilized, although not necessarily with equivalent results.

The source of the free radical catalyst or initiator is preferably a decomposing peroxide. Some specific examples of such compounds which are capable of forming free radicals under the reaction conditions hereinafter set forth in greater detail will include peroxy compounds containing the bivalent radical —O—O—. As hereinbefore set forth the organic peroxy compounds constitute a preferred class of catalyst for use in this invention and include peracetic acid, persuccinic acid, dimethyl peroxide, diethyl peroxide, dipropyl peroxide, di-t-butyl peroxide, butyryl peroxide, lauroyl peroxide, benzoyl peroxide, tetrahydronaphthalene peroxide, urea peroxide, t-butyl perbenzoate, t-butyl hydroperoxide, methylcyclohexyl hydroperoxide, cyclohexanone peroxide, cumene hydroperoxide, etc. Thus, organic peroxy compounds which are compounded commercially with various diluents for use as free radical generating compounds may be used and include benzoyl peroxide compounded with calcium sulfate, benzoyl peroxide compounded with camphor, etc. Only catalytic amounts (less than stoichiometric amounts) are needed.

The reaction of the present process involving the aforementioned starting materials is effected at elevated reaction temperatures which should be at least as high as the initial decomposition temperature of the free radical generating compounds, such as the peroxide compound, in order to liberate and form free radicals which promote the reaction. In selecting a particular reaction temperature for use in the process of the present invention, two considerations must be taken into account. First, sufficient energy by means of heat must be supplied to the reaction system so that the reactants, namely, the thionyl chloride and the olefinic hydrocarbon, will be activated sufficiently for condensation to take place when free radicals are generated by the catalyst. Second, free radical generating compounds such as peroxy compounds, particularly organic peroxides, decompose at a measurable rate with time in a logarithmic function dependant upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C. and 1.7 hours at 145° C. (calculated from data for the first 33% decomposition). A reaction system temperature must then be selected so that the free radical generating compound decomposes smoothly with the generation of free radicals at a half life which is not too long. In other words, sufficient free radicals must be present to induce the present chain reaction to take place, and these radicals must be formed at a temperature at which the reactants are in a suitable activated state for condensation. When the half life of the free radical generating compound is greater than 10 hours, radicals are not generated at a sufficient rate to cause the reaction to go forward at a detectable rate. Thus, the reaction temperature may be within the range of from about 50° to about 300° C. and at least as high as the decomposition temperature of the peroxide, by which is meant a temperature such that the half life of the free radical generating compound is not greater than 10 hours. Since the half life for each free radical generating compound is different at different temperatures, the exact temperature to be utilized in a particular reaction will vary. However, persons skilled in the art are well acquainted with the half life versus temperature data for different free radical generating compounds and thus it is within the skill of one familiar with the art to select the particular temperature needed for any particular compound. However, the operating temperatures generally do not exceed the decomposition temperature of the catalyst by more than about 150° C. For example, when a free radical generating compound such as t-butyl perbenzoate having a decomposition temperature of approximately 115° C. is used, the operating temperature of the process is from about 115° to about 265° C. When di-t-butyl peroxide having a decomposition temperature of about 130° C. is used, the process is run at a temperature ranging from about 130° to about 280° C. Higher reaction temperatures may be employed, but little advantage is gained if the temperature is more than the hereinbefore mentioned 150° C. higher than the decomposition temperature of the catalyst. In addition to the elevated temperatures which are utilized, the reaction may also be effected at elevated pressures ranging from about 1 to about 100 atmospheres or more, the preferred operating pressure of the process being that which is required to maintain a substantial portion of the reactants in liquid phase. Pressure is not an important variable in the process of this invention. However, because of the low boiling points of some of the reactants, it is necessary to utilize pressure withstanding equipment to insure liquid phase conditions. In batch type operations it is often desirable to utilize pressure withstanding equipment, to charge the reactants and free radical generating compound (and, if desired, an inert solvent such as an alkane) to the vessel, and to pressure the vessel with 10, 30, 50 or more atmospheres with an inert gas such as nitrogen. This helps to insure the presence of liquid phase conditions. However, when the mole quantity of reactants is sufficient, the pressure which they themselves generate at the temperature utilized is sufficient to maintain the desired phase conditions. Furthermore, the concentration of the free radical generating compound employed in this process may vary over a rather wide range but it is desirable to utilize low concentrations of the compounds such as from about 0.1 to about 10% of the total weight of the combined starting materials charged to the process. The reaction time may be within the range of from less than one minute to several hours depending up the temperature and half life of the free radical generating compound. Generally speaking, contact times of at least 10 minutes are preferred.

In the event that the desired product which is prepared according to the process of this invention comprises an organic sulfoxide compound, the reaction will be effected at temperatures less than about 120° C., therefore care must be taken in the selection of the free radical generating initiator which is utilized as the catalyst in this process in order that the decomposition temperature of this compound be less than about 120° C. For example, if said sulfoxide is desired it may be preferred to use a compound such as benzoyl peroxide which has a decomposition temperature of about 80° C. and therefore would allow the process of this invention to be effected at temperatures well below the upper limit of that required for the obtention of the sulfoxide. Conversely speaking, if a sulfide is to be the primary product which is desired to be produced according to the process of this invention, free radical initiators which possess a decomposition temperature in excess of about 120° C. should preferably be used, said compounds being exemplified by di-t-butyl peroxide which possesses a decomposition temperature of about 130° C. Alternatively, a compound such as benzoyl peroxide can be used provided that the reaction temperature is above about 120° C.

The process of this invention may be effected in any suitable manner and may comprise either a batch or continuous type operation. For example, when a batch type operation is used a quantity of the olefinic hydrocarbon along with the thionyl chloride is placed in an appropriate apparatus such as, for example, a rotating autoclave along with a catalytic amount of the organic peroxy compound. As hereinbefore set forth, in the event that temperatures higher than those normally used are to be employed, the desired pressure which is required to maintain a major portion of the reactants in liquid form may be effected by the introduction of an inert gas such as nitrogen. It is also contemplated that the desired pressure may also be effected by utilizing the olefinic hydrocarbon, if in gaseous form, as such an agent. Thereafter the apparatus is heated to the desired operating temperature which, as hereinbefore set forth, ranges from a temperature at least as high as the decomposition temperature of the free radical initiator up to a temperature approximately 150° C. higher than said decomposition temperature, the operating temperature being dependent upon whether the desired product comprises an organic sulfoxide or an organic sulfide compound. Upon completion of the desired residence time which may range from 10 minutes up to about 10 hours or more in duration, the apparatus and contents thereof are allowed to cool to room temperature. Any excess pressure is vented and the reaction product is separated from any remaining peroxide, unreacted starting materials and/or undesired side reaction products, and thereafter recovered by conventional means such as fractional distillation, etc.

It is also contemplated within the scope of this invention that the process described herein may be effected in a continuous type of operation. In this type of operation the starting materials comprising the thionyl chloride, the olefinic hydrocarbon whether in gaseous or liquid form, and the peroxy compound are continuously charged to a reaction zone which is maintained at the proper operating conditions of temperature and pressure. It is contemplated that the thionyl chloride and the olefin may be charged to the reaction zone through separate lines or, if so desired, they may be admixed before entry into said reactor and charged thereto in a single line. In addition, the organic peroxy compound which acts as a free radical initiator may also be continuously charged to the reaction zone through a separate line in a catalytic amount per amount of starting materials or it may be charged in the same lines as one of the reactants. After a predetermined residence time has elapsed, the reactor effluent is continuously withdrawn and subjected to a separation step whereby the desired organic sulfoxide or organic sulfide which has been produced dependent upon the operating temperature, is separated from any remaining peroxide, undesired side-products or unreacted starting materials, the latter being recycled to form a portion of the feed stock.

Some specific examples of organic sulfoxides or organic sulfides which may be prepared according to the process of this invention include bis(2-chloroethyl)sulfoxide,
bis(2-chloroethyl)sulfide,
bis(2-chloropropyl)sulfoxide,
bis(2-chloropropyl)sulfide,
bis(2-chlorobutyl)sulfoxide,
bis(2-chlorobutyl)sulfide,
bis(2-chloropentyl)sulfoxide,
bis(2-chloropentyl)sulfide,
bis(2-chlorohexyl)sulfoxide,
bis(2-chlorohexyl)sulfide,
bis(2-chlorooctyl)sulfoxide,
bis(chlorooctyl)sulfide,
bis(2-dodecyl)sulfoxide, bis(2-dodecyl)sulfide,
bis(β-chloro-β-phenylethyl)sulfoxide,
bis(β-chloro-β-phenylethyl)sulfide, etc.

It is to be understood that the aforementioned compounds are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

In this example a mixture of 63 g. (0.53 mole) of thionyl chloride, 46 g. (0.46 mole) of n-heptane solvent and 8 g. (0.05 mole) of di-t-butyl peroxide was placed in the glass liner of a rotating autoclave. The autoclave was sealed and 1.5 moles of ethylene was charged thereto until an initial pressure of 40 atmospheres was reached. The autoclave was then heated to a temperature of 130° C. and maintained in a range of from 130° C. to 140° C. for a period of 8 hours, the maximum pressure rising to 66 atmospheres. At the end of the aforementioned 8 hour period the heating was discontinued and the autoclave allowed to return to room temperature, the final pressure at room temperature being 25 atmospheres. The excess pressure was discharged and the reaction product comprising a dark liquid was recovered. The product was subjected to fractional distillation under reduced pressure in order to isolate the pure material. There was obtained a water-white liquid boiling chiefly at 110° to 112° C. at 21 mm. pressure. The liquid crystallized when cooled to −78° C. The product which comprised bis(2-chloroethyl)sulfide was subjected to analysis with the following result.

Calculated for $C_4H_8Cl_2S$ (percent): Cl, 44.59; S, 20.12. Found (percent): Cl, 44.2; S, 19.9.

EXAMPLE II

In this example 26 g. (0.22 mole) of thionyl chloride, 53 g. (0.53 mole) of n-heptane and 4 g. (0.02 mole) of benzoyl peroxide were placed in the glass liner of a rotating autoclave. The autoclave was sealed and 1.5 moles of ethylene were charged thereto until an initial pressure of 40 atmospheres was reached. The autoclave was then heated to a temperature of 80° C. and maintained in a range of from 80° to 100° C. for a period of 8 hours, the maximum pressure at the end of this time rising to 50 atmospheres. At the end of this time the heating was discontinued and the autoclave allowed to return to room temperature, the final pressure at room temperature being 35 atmospheres. The excess pressure was discharged and the reaction product comprising 79 g. of a clear, pale amber liquid was recovered, said product comprising bis-(2-chlorethyl)sulfoxide.

EXAMPLE III

In this example 31 g. (0.26 mole) of thionyl chloride, 46 g. (0.46 mole) of n-heptane solvent and 5 g. (0.02 mole) of benzoyl peroxide were placed in the glass liner of a rotating autoclave. Following this 1.2 moles of propene was charged to the autoclave until an initial pressure of 4 atmospheres was reached. The autoclave was then heated to a temperature of 80° C. and maintained in the range of from 80° to 100° C. for a period of 8 hours, the maximum pressure at this time being 7 atmospheres. At the end of the 8 hour period heating was discontinued and the autoclave allowed to return to room temperature, the final pressure at room temperature being 1 atmosphere. The reaction product comprising bis-(2-chloropropyl)sulfoxide was recovered as a clear, yellow-amber liquid.

EXAMPLE IV

In this example a mixture of 63 g. (0.53 mole) of thionyl chloride, 46 g. (0.46 mole) of n-heptane and 7 g. (0.05 mole) of di-t-butyl peroxide are placed in the glass liner of a rotating autoclave. The autoclave is sealed and 1.5 mole of 1-butene is charged thereto until an initial pressure of 40 atmospheres is reached. The autoclave is then heated to a temperature of 130° C. and maintained in a range of from 130° to 140° C. for a period of 8 hours, the maximum pressure at this time rising to about 65 atmospheres. At the end of this time after heating has been discontinued and the autoclave allowed to return to room temperature, the excess pressure is discharged and the autoclave opened. The reaction product is recovered and subjected to fractional distillation under reduced pressure whereby the desired product comprising bis(2-chlorobutyl)sulfide is recovered.

EXAMPLE V

A mixture of 53 g. of thionyl chloride, 40 g. of cyclohexane, 8 g. of benzoyl peroxide and 150 g. of styrene is placed in the glass liner of a rotating autoclave. The autoclave is sealed and nitrogen is pressed in until an initial pressure of 40 atmospheres is reached. Following this the autoclave is heated to a temperature of 80° C. and maintained in the range of from 80° C. to 100° C. for a period of 8 hours. Following this heating is discontinued and the autoclave allowed to return to room temperature. The excess pressure is discharged and the autoclave is opened. The reaction product is recovered and subjected to fractional distillation whereby the desired product comprising bis(β - chloro-β-phenylethyl)sulfoxide is recovered.

EXAMPLE VI

In this example a mixture comprising 63 g. of thionyl chloride, 150 g. of a solvent comprising n-heptane, 7 g. of di-t-butyl peroxide and 100 g. of 1-pentene is treated in a manner similar to that set forth in the above examples, that is, by placing the mixture in a rotating autoclave, sealing the autoclave, pressing in nitrogen until an initial pressure of 40 atmospheres is reached and heating said autoclave and mixture to a temperature of 130° C. After maintaining the autoclave at a maximum temperature of 140° C. for a period of 8 hours during which time the maximum pressure will rise to about 65 atmospheres, heating is discontinued and the autoclave allowed to return to room temperature. The excess pressure which is present at room temperature is discharged, the reaction mixture is recovered and subjected to fractional distillation under reduced pressure, the desired product comprising bis(2-chloropentyl)sulfide being recovered therefrom.

I claim as my invention:

1. A process for the preparation of an organic sulfoxide which comprises condensing thionyl chloride with an olefinic hydrocarbon in the presence of a free radical generating compound at a condensation temperature below about 120° C. but at least as high as the decomposition temperature of the last-named compound and at sufficient pressure to maintain a substantial portion of the reactants in liquid phase, and recovering the resultant organic sulfoxide.

2. A process for the preparation of an organic sulfide which comprises condensing thionyl chloride with an olefinic hydrocarbon in the presence of a free radical generating compound at a condensation temperature above about 120° C. and at least as high as the decomposition temperature of the last-named compound and at sufficient pressure to maintain a substantial portion of the reactants in liquid phase, and recovering the resultant organic sulfide.

3. The process as set forth in claim 1 in which said free radical generating compound is an organic peroxide compound.

4. The process as set forth in claim 2 in which said free radical generating compound is an organic peroxide.

5. The process as set forth in claim 2 in which said free radical generating compound is di-t-butyl peroxide.

6. The process as set forth in claim 1 in which said olefinic hydrocarbon is ethylene and said organic sulfoxide is bis(2-chloroethyl)sulfoxide.

7. The process as set forth in claim 4 in which said olefinic hydrocarbon is ethylene and said organic sulfide is bis(2-chloroethyl)sulfide.

8. The process as set forth in claim 1 in which said olefinic hydrocarbon is propylene and said organic sulfoxide is bis(2-chloropropyl)sulfoxide.

9. The process as set forth in claim 2 in which said olefinic hydrocarbon is 1-butene and said organic sulfide is bis(2-chlorobutyl)sulfide.

10. The process as set forth in claim 1 in which said olefinic hydrocarbon is styrene and said organic sulfoxide is bis($\beta$-chloro-$\beta$-phenylethyl)sulfoxide.

11. The process as set forth in claim 2 in which said olefinic hydrocarbon is 1-pentene and said organic sulfide is bis(2-chloropentyl)sulfide.

References Cited
UNITED STATES PATENTS 2,669,587  2/1954  Miller et al. _____ 260—609 A

OTHER REFERENCES

Patai et al.: "J.A.C.S." 72, 1034–5 (1950).
Dhami: "Chem. and Ind." 30, 1004–5 (1968), July 27.

JOSEPH REBOLD, Primary Examiner

D. R. PHILLIPS, Assistant Examiner

U.S. Cl. X.R.

260—609 R, 609 E